US011899408B2

(12) United States Patent
Ishikawa et al.

(10) Patent No.: US 11,899,408 B2
(45) Date of Patent: Feb. 13, 2024

(54) POINTER CONTROLLER AND POINTER CONTROL METHOD

(71) Applicant: CASIO COMPUTER CO., LTD., Tokyo (JP)

(72) Inventors: Tomoki Ishikawa, Ome (JP); Shuto Oikawa, Tachikawa (JP); Hitoshi Tanaka, Hino (JP); Chiharu Shiratori, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 398 days.

(21) Appl. No.: 17/176,245

(22) Filed: Feb. 16, 2021

(65) Prior Publication Data

US 2021/0263478 A1 Aug. 26, 2021

(30) Foreign Application Priority Data

Feb. 25, 2020 (JP) ................................ 2020-028980

(51) Int. Cl.

*G04G 9/00* (2006.01)
*G04G 17/08* (2006.01)
*G04G 19/00* (2006.01)

(52) U.S. Cl.

CPC ........... *G04G 9/0064* (2013.01); *G04G 17/08* (2013.01); *G04G 19/00* (2013.01)

(58) Field of Classification Search

CPC ....... G04G 9/0064; G04G 17/08; G04G 19/00
See application file for complete search history.

(56) References Cited

U.S. PATENT DOCUMENTS 8,923,096 B1 * 12/2014 Stotz ......................... G04F 8/02 368/110
2004/0047242 A1 * 3/2004 Germiquet ............. G01D 7/002 368/11

(Continued)

FOREIGN PATENT DOCUMENTS

CN 1490686 A 4/2004
CN 108303868 A * 7/2018 ............. G04C 17/00

(Continued)

OTHER PUBLICATIONS

First Office Action dated Mar. 2, 2022 received in Chinese Patent Application No. CN 202110204813.2 together with an English language translation.

(Continued)

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

A pointer controller includes at least one processor; and a display that includes a pointer. The at least one processor is configured to control the display so as to display an elapsed time, switching between (i) a first display mode for display of the elapsed time cumulatively by causing, upon resumption of display, movement of the pointer that inherits a previous display time and (ii) a second display mode for display of the elapsed time non-cumulatively by causing, upon resumption of display, movement of the pointer that does not inherit the previous display time. The movement of the pointer controlled by the at least one processor is such that the first display mode and the second display mode differ from each other in a way of movement that indicates how the pointer moves.

12 Claims, 8 Drawing Sheets

(56) References Cited

U.S. PATENT DOCUMENTS

| | | | | |
|---|---|---|---|---|
| 2009/0154296 A1* | 6/2009 | Behling | G04B 19/247 | |
| | | | 368/10 | |
| 2017/0075305 A1* | 3/2017 | Ryu | G04G 9/0064 | |

FOREIGN PATENT DOCUMENTS

| | | | |
|---|---|---|---|
| CN | 108303868 A | 7/2018 | |
| JP | 2006-275948 A | 10/2006 | |
| JP | 2009-534674 A | 9/2009 | |
| JP | 7070593 B2 | 5/2022 | |

OTHER PUBLICATIONS

Notice of Reasons for Refusal dated Nov. 14, 2023 received in Japanese Patent Application No. JP 2022-074088.

* cited by examiner

TIME t1: DIVE TIME DISPLAY MODE

TIME t2: DIVE TIME DISPLAY MODE

TIME t2: REST TIME DISPLAY MODE

TIME t3: REST TIME DISPLAY MODE

TIME t3: DIVE TIME DISPLAY MODE

TIME t4: DIVE TIME DISPLAY MODE

TIME t4: REST TIME DISPLAY MODE

TIME t5: REST TIME DISPLAY MODE

POINTER CONTROLLER AND POINTER CONTROL METHOD

CROSS-REFERENCE TO RELATED APPLICATION

This application is based upon and claims the benefit of priority under 35 USC 119 of Japanese Patent Application No. 2020-028980 filed on Feb. 25, 2020, the entire disclosure of which, including the description, claims, drawings, and abstract, is incorporated herein by reference in its entirety.

FIELD

This application relates to a pointer controller and a pointer control method.

BACKGROUND

Diver's watches are widely used as wristwatches having excellent durability and capable of use even in high water pressure environments. A diver's watch mentioned in Unexamined Japanese Patent Application Publication 2009-534674 is an analog type diver's watch that indicates time by use of a pointer. Among diver's watches, watches are known that have two types of display modes that are a dive time display mode and a rest time display mode, and that have a function for switching between the display modes to display elapsed time.

The dive time display mode is a mode that is used when displaying a dive time of a diver. The display is performed cumulatively in the dive time display mode. That is to say, in the dive time display mode, the dive time is retained even after ending of the display, and upon resumption of the dive time display mode, the dive time is displayed as measured starting from the previously completed finish time.

However, the rest time display mode is used when displaying the rest time of the diver. In the rest time display mode, display is performed non-cumulatively. That is to say, in the rest time display mode, the measured time resets each time the display finishes, and upon resumption of the rest time display mode, measurement begins at zero for the indication of the rest time.

SUMMARY

A pointer controller includes at least one processor, and a display that includes a pointer. The at least one processor is configured to control the display so as to display an elapsed time, switching between (i) a first display mode for display of the elapsed time cumulatively by causing, upon resumption of display, movement of the pointer that inherits a previous display time and (ii) a second display mode for display of the elapsed time non-cumulatively by causing, upon resumption of display, movement of the pointer that does not inherit the previous display time. The movement of the pointer controlled by the at least one processor is such that the first display mode and the second display mode differ from each other in a way of movement that indicates how the pointer moves.

A pointer control method performed by a pointer controller including at least one processor, and a display that includes a pointer, includes controlling, by the at least one processor, the display so as to display an elapsed time, switching between (i) a first display mode for display of the elapsed time cumulatively by causing, upon resumption of display, movement of the pointer that inherits a previous display time and (ii) a second display mode for display of the elapsed time non-cumulatively by causing, upon resumption of display, movement of the pointer that does not inherit the previous display time. The movement of the pointer controlled by the at least one processor is such that the first display mode and the second display mode differ from each other in a way of movement that indicates how the pointer moves.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present disclosure is described below in detail with reference to drawings. Parts that are the same or equivalent within the drawings are given the same reference sign.

Figure 1:
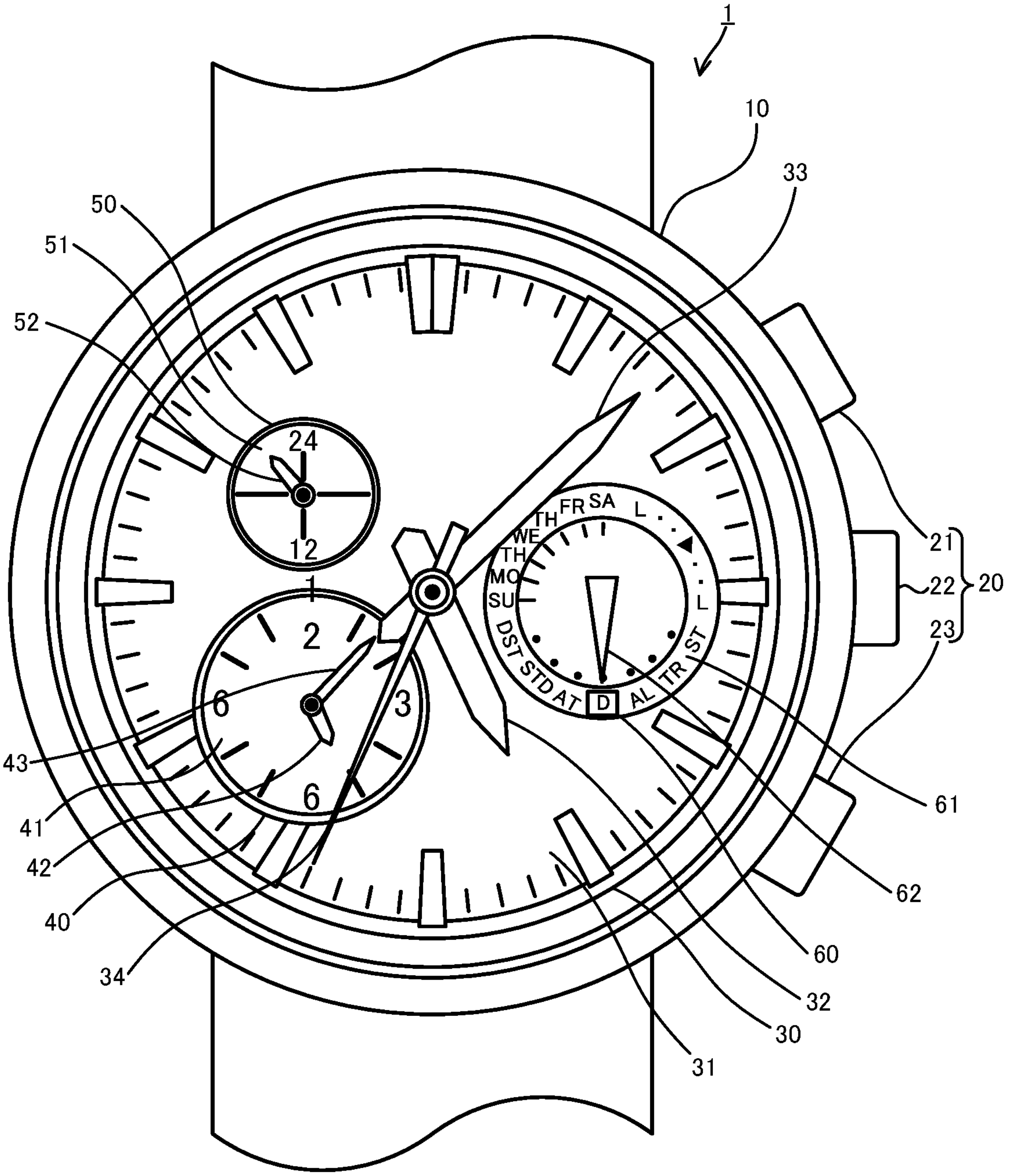
FIG. 1 is an exterior view of a diver's watch according to an embodiment of the present disclosure.

FIG. 1 is an exterior view of a diver's watch 1 according to the embodiment of the present disclosure. The diver's watch 1 is equipped with a waterproof case 10 including tempered glass at an upper face, and an operation unit 20, that is, button switches 21-23 arranged at a side face of the case 10. A main display 30, a sub-display 40, a 24-hour display 50, and a mode selector 60 are arranged within the case 10 so as to be visible through the tempered glass.

The main display 30, that is, the display unit, is equipped with a dial 31 provided with markers or a scale for indication of the time, and a freely rotatable pointer, that is, an hour hand 32, a minute hand 33, and a second hand 34, mounted at a center of the dial 31. During a clock mode, the hour hand 32, the minute hand 33, and the second hand 34 indicate the present time in hours, minutes, and seconds. However, in a below-described diver's mode, the minute hand 33 indicates a measured elapsed time, that is the dive time or the rest time. The minute hand 33 is one example of a first pointer of the present disclosure. Moreover, while in such a mode, the hour hand 32 and the second hand 34 are controlled so as to operate in different manners in accordance with whether the dive time or the rest time is being displayed. At least one of the hour hand 32 or the second hand 34 is one example of the second pointer of the present disclosure. Display by the main display 30 during the diver's mode is described below in detail.

The sub-display 40 is arranged toward the 8 o'clock direction of the main display 30, and is equipped with a dial 41 provided with markers or a scale for indicating the time, and a freely rotatable pointer, that is, an hour hand 42 and a minute hand 43, mounted at a center of the dial 41. The hour hand 42 and the minute hand 43 on the dial 41 indicate the present time (hours, minutes) via the sub-display 40 in the same manner as the main display 30. Further, the present time of a designated time zone may be displayed in the sub-display 40.

The 24-hour display 50 is arranged toward the 10 o'clock direction of the main display 30, and is equipped with a dial 51 provided with markers or a scale indicating time, and a freely rotatable pointer 52 mounted at a center of the dial 51. The pointer 52 operates in an interlocking manner with the hour hand 32 of the main display 30, indicates the present time (hour), and rotates one time per 24 hours. That is to say, when the hour hand 32 of the main display 30 rotates twice, that is, when 24 hours passes, the pointer 52 rotates one time.

The mode selector 60 is arranged toward the 3 o'clock direction of the main display 30 and is used for operations such as selection of various modes of the diver's watch 1. The mode selector 60 is equipped with a dial 61 and a freely rotatable pointer 62 mounted at a center of the dial 61. At certain intervals at the periphery of the dial 61 is indicated text lettering corresponding to days of the week, text lettering corresponding to various modes, or the like. For example, "ST", "TR", "AL", "D", "AT", "STD", and "DST" on the dial correspond respectively to a stopwatch mode, a timer mode, an alarm mode, a diver's mode, an auto mode, a standard time mode, and a daylight-saving time mode. By the diver who is the user of the diver's watch 1 performing a specific operation using the operation unit 20, the pointer 62 rotates, thereby enabling setting of the diver's watch 1 to a mode corresponding to the text lettering indicated by the pointer 62. For example, the pointer 62 in FIG. 1 indicates "D" of the dial 61, and thus the diver's watch 1 is set to the diver's mode. Further, during the normal clock mode, the pointer 62 is controlled so as to indicate the present corresponding day of the week from among the text lettering indicating the days of the week (SU, MO, TH, WE, TH, FR, and SA).

The diver's mode that is one of the modes of the diver's watch 1 is described as follows. The diver's mode is a mode used when the diver is diving or resting. The diver's mode further has as sub-modes the dive time display mode and the rest time display mode. Switching between the dive time display mode and the rest time display mode occurs each time the diver uses the operation unit 20 to perform a prescribed operation.

The dive time display mode is a sub-mode for display of the dive time of the diver. In the dive time display mode, the measured dive time (minutes) is indicated by the minute hand 33 of the main display 30. Also, in the dive time display mode, the display of the dive time is performed cumulatively. Therefore, although the diver duration time display ends upon switching from the dive time display mode to the rest time display mode, upon resumption of the dive time display mode thereafter, the dive time is displayed, that is, is inherited, from the time of ending of the previous display. Furthermore, in the dive time display mode, the hour hand 32 moves so that overlapping occurs with the minute hand 33. Therefore, the hour hand 32 and the minute hand 33 operate identically in the dive time display mode. However, the second hand 34 operates similarly to operation during the clock mode. The dive time display mode is one example of the first display mode of the present disclosure.

The rest time display mode is a sub-mode for display of the rest time of the diver. In the rest time display mode similarly to the dive time display mode, the measured rest time (minutes) is indicated by the minute hand 33 of the main display 30. Further, the display of the rest time is performed non-cumulatively during the rest time display mode. Therefore, although the display of the rest time ends upon switching from the rest time display mode to the dive time display mode, then upon resumption of the rest time display mode, the previously displayed rest time is reset, and the rest time is displayed beginning at zero. Furthermore, in the rest time display mode, the second hand 34 rotates in a direction opposite to that at normal times, that is to say, rotates in the counterclockwise direction. However, the hour hand 32 operates similarly to operation during the clock mode. The rest time display mode is one example of a second display mode of the present disclosure.

Figure 2:
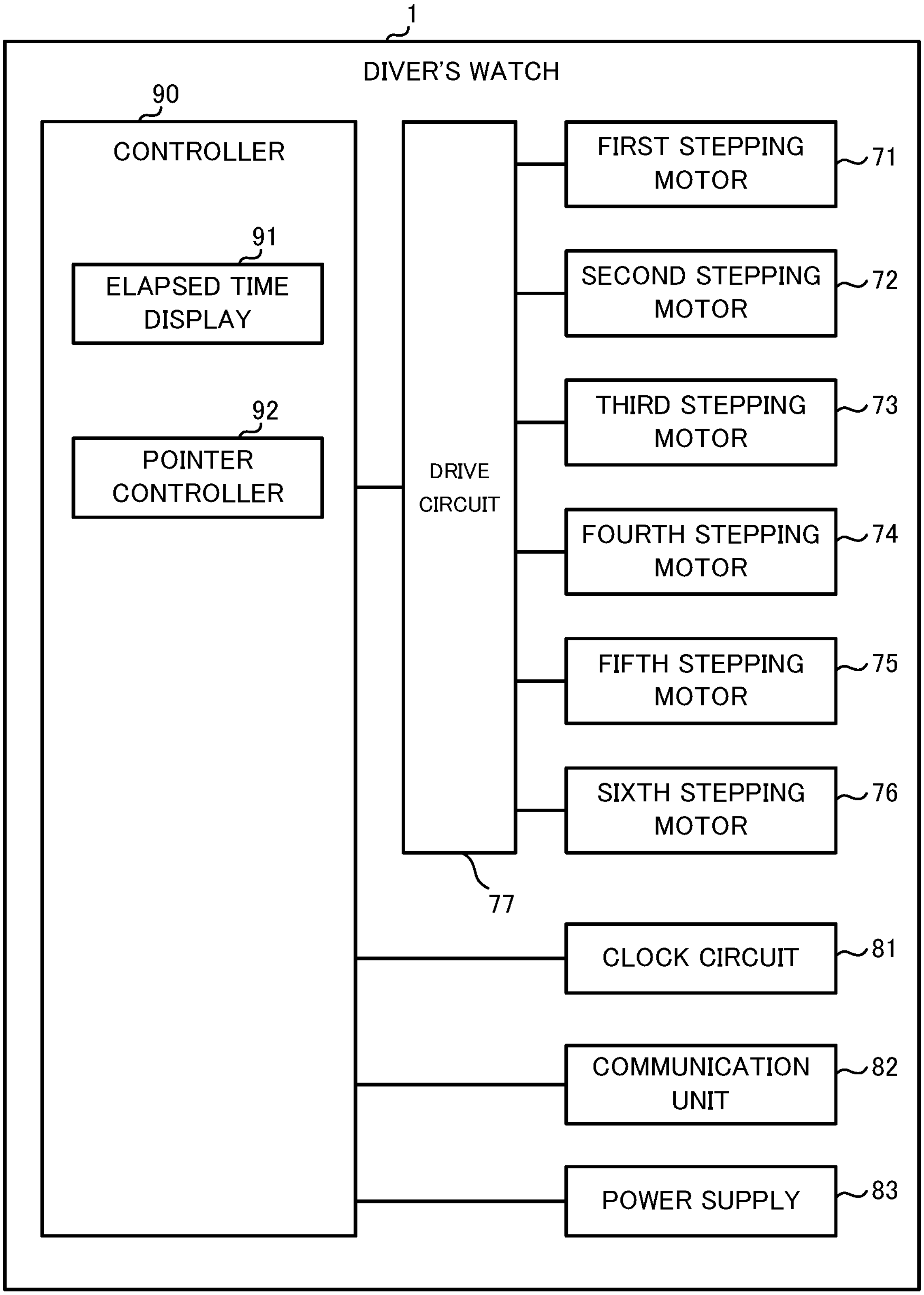
FIG. 2 is a block diagram illustrating internal configuration of the diver's watch according to the embodiment of the present disclosure.

Internal structure of the diver's watch 1 is described next with reference to FIG. 2. The diver's watch is equipped with, as the internal configuration, a first stepping motor 71 through a sixth stepping motor 76, a drive circuit 77, a clock circuit 81, a communication unit 82, a power supply 83, and a controller 90.

The first stepping motor 71 through the third stepping motor 73 run respectively, via one or multiple gear wheels, the hour hand 32, the minute hand 33, and the second hand 34 of the main display 30. The hour hand 32, the minute hand 33, and the second hand 34 are driven separately by the first stepping motor 71 through the third stepping motor 73, and thus can be moved independently of each other.

The fourth stepping motor 74 drives the hour hand 42 and the minute hand 43 of the sub-display 40 via one or multiple gear wheels. The fifth stepping motor 75 drives the pointer 52 of the 24-hour display 50 via one or multiple gear wheels. The sixth stepping motor 76 drives the pointer 62 of the mode selector 60 via one or multiple gear wheels.

The drive circuit 77 causes driving of the first stepping motor 71 through the sixth stepping motor 76 in accordance with a command from the controller 90.

The clock circuit 81 is equipped with an oscillator circuit, a divider circuit, or the like and performs counting of the present time. The oscillator circuit, in combination with a quartz or the like oscillator element, generates, and outputs to the divider circuit, an inherent frequency signal. The divider circuit divides the signal from the oscillator circuit into signal pulses of the frequency and outputs the signal pulses. The clock circuit 81 counts the pulses of a prescribed frequency signal output from the divider circuit, and counts the present time by addition to an initial time. Moreover, the clock circuit 81 corrects the present time on the basis of time information received by the communication unit 82.

The communication unit 82 receives time information. The time information includes time information transmitted from a global positioning system (GPS) satellite and time information received via standard frequency time information radio waves. The communication unit 82 includes a wireless communication module such as that of a wireless local area network (LAN), Bluetooth (registered trademark), or the like.

The power supply 83 is equipped with a transmissive solar panel arranged on the upper face of the case 10 and supplies power to the diver's watch.

The controller 90 is equipped with a central processing unit (CPU) that is a processor, a read-only memory (ROM), a random-access memory (RAM), or the like. By reading and outputting to the RAM a program stored in the ROM, and then executing the program, the controller 90 functions as an elapsed time display 91 and as a pointer controller 92.

Upon switching between the dive time display mode and the rest time display mode, the elapsed time display 91 uses the minute hand 33 to display the elapsed time, that is, the dive time or the rest time, in accordance with the display mode to which switching is performed.

The pointer controller 92 controls the various pointers with which the diver's watch is equipped. For example, the pointer controller 92 controls operation of the hour hand 32 and the second hand 34 in an operating manner that differs during display in the dive time display mode versus during display in the rest time display mode.

Figure 3:
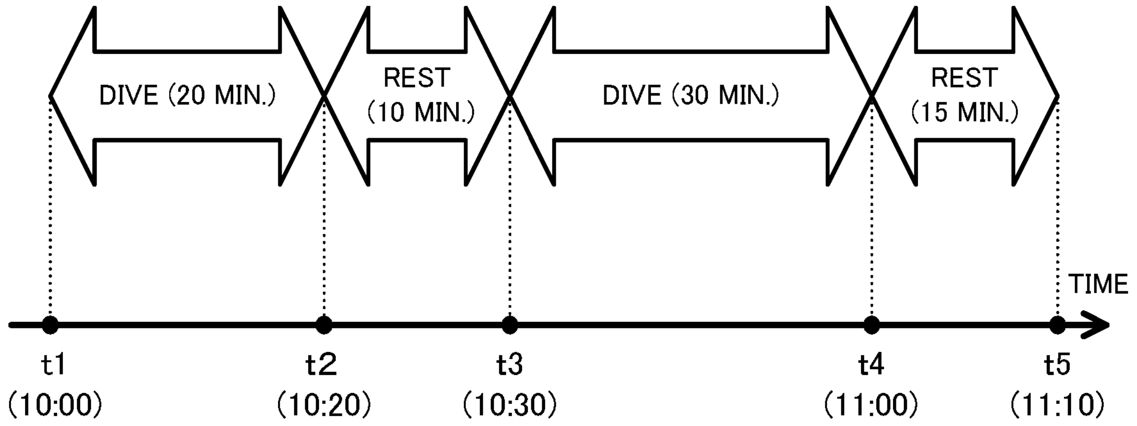
FIG. 3 is a drawing for description of elapsed time display processing according to the embodiment of the present disclosure.
Figure 4:
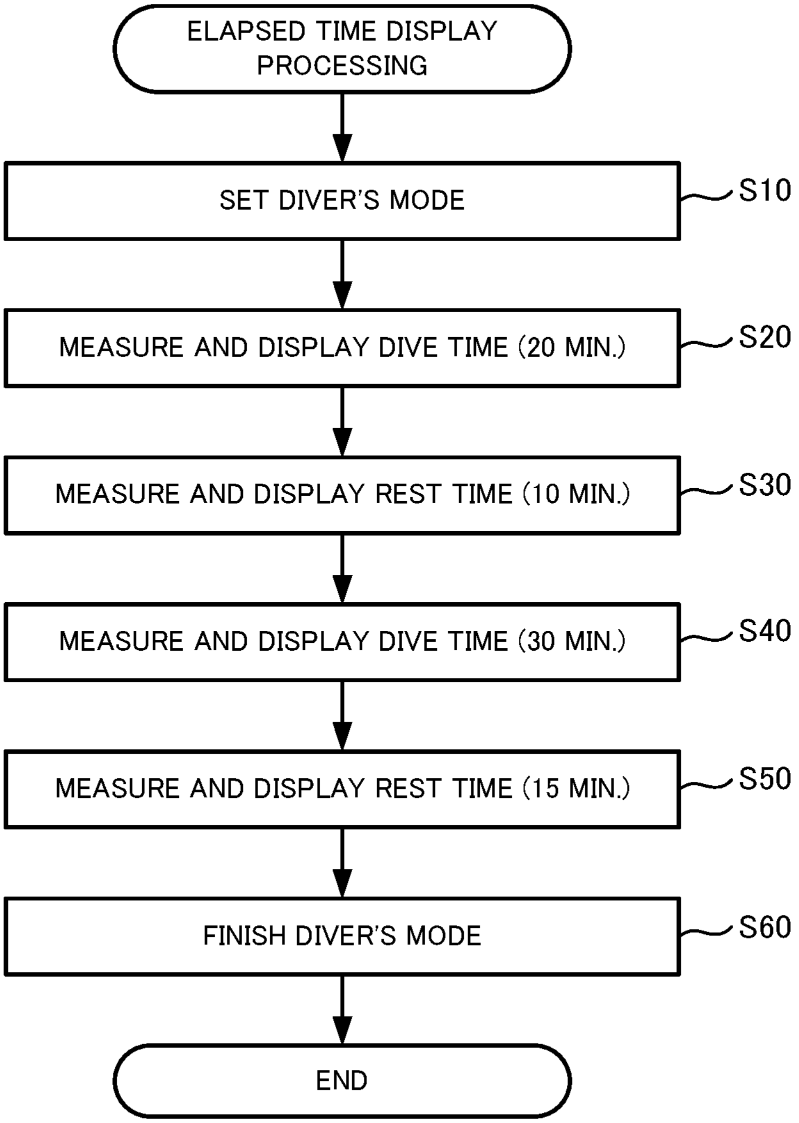
FIG. 4 is a flowchart of the elapsed time display processing according to the embodiment of the present disclosure.

Next, operation of elapsed time display processing for display of the dive time and the rest time of the diver by the diver's watch 1 is described by citing a specific example with reference to FIGS. 3-8. The diver is assumed to have two each dives and rests alternatingly from a time t1 (10:00) to a time t5 (11:15) as illustrated in FIG. 3, and during this period, the controller 90 of the diver's watch 1 executes elapsed time display processing as illustrated in the flowchart of FIG. 4. Furthermore, FIGS. 5-8 illustrates the main display 30 of the diver's watch 1 at each of the times t1 to t5. For clear visibility in the drawings, the sub-display 40, the 24-hour display 50, and the mode selector 60 on the main display 30 are not illustrated in FIGS. 5-8.

Firstly, the diver operates the operation unit 20 of the diver's watch 1 at a time immediately prior to the time t1 to point the pointer 62 of the mode selector 60 toward the "D" of the dial 61. In accordance with such operation, the controller 90 sets the diver's watch 1 to the diver's mode (step S10 in FIG. 4).

Thereafter, the diver uses the operation unit 20 at the time t1 to perform an operation for switching the sub-mode to the dive time display mode and begins the dive. In response to such operation, the controller 90 switches the sub-mode to the dive time display mode and uses the minute hand 33 to display the measured dive time starting with 0 minutes (step S20).

Figure 5A:
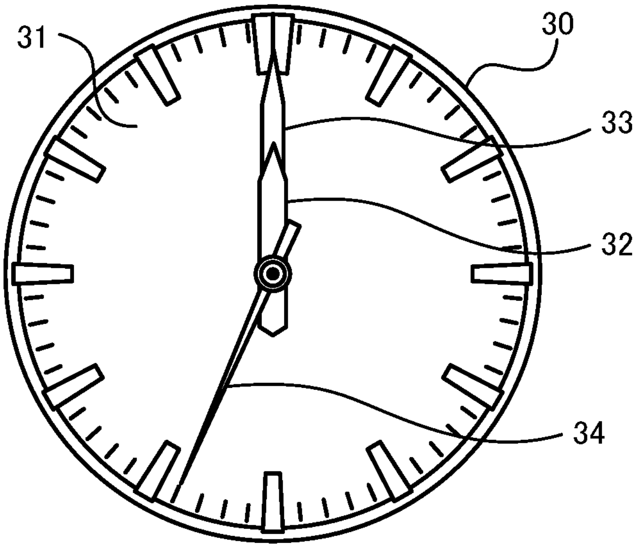
FIG. 5A is a display example drawing illustrating a main display during elapsed time display processing according to the embodiment of the present disclosure.

FIG. 5A illustrates the main display 30 immediately after switching to the dive time display mode at time t1. The minute hand 33 indicates 0 minutes since this is a first dive start time and the dive time is not measured heretofore. Moreover, the hour hand 32 is controlled so that overlapping occurs with the minute hand 33. Hereinafter, the controller 90 during the dive time display mode controls the minute hand 33 so as to indicate the measured dive time in minute units and controls the hour hand 32 for maintaining the state of overlapping with the minute hand 33. That is to say, the hour hand 32 and the minute hand 33 are made to move in the same manner during the dive time display mode. Further, the second hand 34 is controlled so as to rotate clockwise once per 60 seconds during the dive display mode, similarly to the clock mode.

Figure 5B:
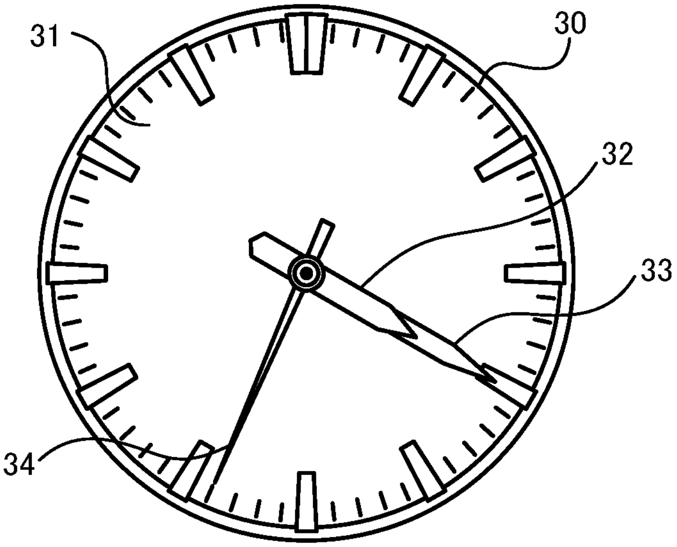
FIG. 5B is a display example drawing illustrating of the main display during elapsed time display processing according to the embodiment of the present disclosure.

Next, upon checking the reaching of 20 minutes dive time per the display illustrated in FIG. 5B at time t2 (10:20), the diver ends the first dive and rises to the water surface. Then the diver uses the operation unit 20 to perform an operation for switching the sub-mode to the rest time display mode, and the diver rests. Due to such operation, the controller 90 switches the sub-mode to the rest time display mode, and the measured rest time is displayed by the minute hand 33 starting with measurement of the rest time at 0 minutes (step S30). Furthermore, the controller 90 at this time stores the measured dive time of 20 minutes using the RAM or the like.

Figure 6A:
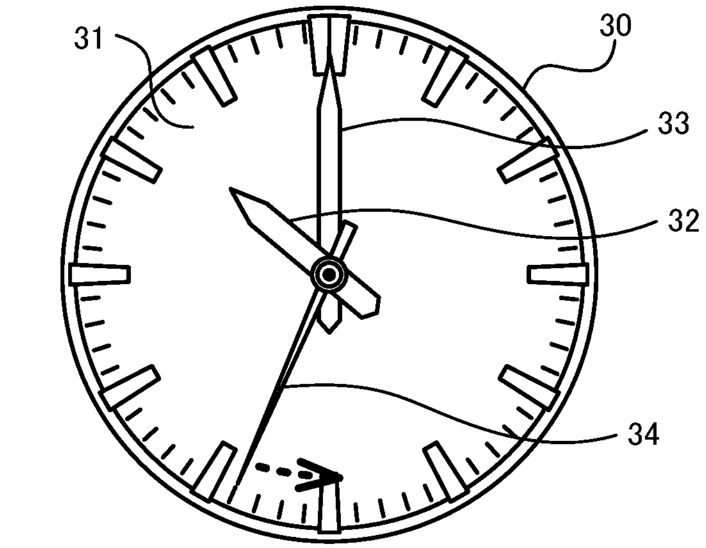
FIG. 6A is a display example drawing illustrating a main display during elapsed time display processing according to the embodiment of the present disclosure.

FIG. 6A illustrates the main display 30 immediately after switching to the rest time display mode at time t2. Due to the present time being the rest start time, the minute hand 33 indicates 0 minutes. Thereafter, during the rest time display mode, the controller 90 controls the minute hand 33 so as to indicate the measured rest time in minute units. Moreover, during the rest time display mode, the controller 90 controls the second hand 34 to rotate counterclockwise once per 60 seconds as indicated by the dashed arrow in the drawings. The hour hand 32 is controlled to indicate the hour of the present time similarly to indication in the clock mode.

Figure 6B:
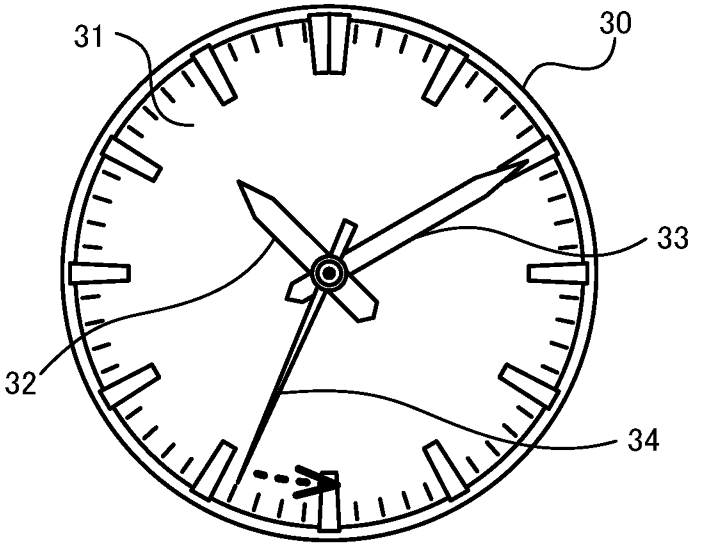
FIG. 6B is a display example drawing illustrating of the main display during elapsed time display processing according to the embodiment of the present disclosure.

Next, upon confirmation at time t3 (10:30) that the rest time reaches 10 minutes per the display illustrated in FIG. 6B, the diver ends the rest. Then the diver uses the operation unit 20 to perform an operation for switching the sub-mode to the dive time display mode, and the second dive starts. Due to such operation, the controller 90 switches the sub-mode to the dive time display mode, and the minute hand 33 indicates the measured dive time beginning with measurement of the dive time from 20 minutes that is the first dive time (step S40).

Figure 7A:
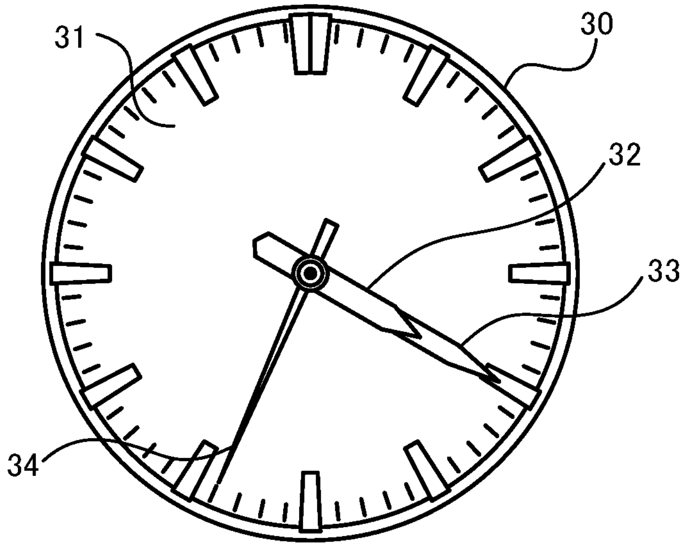
FIG. 7A is a display example drawing illustrating a main display during elapsed time display processing according to the embodiment of the present disclosure.

FIG. 7A illustrates the main display 30 immediately after switching to the dive time display mode at time t3. Due to this being the second dive start time, the minute time 33 indicates 20 minutes that is the previously measured dive time, and the hour hand 32 overlaps with the minute hand 33. Hereinafter, the minute hand 33 is controlled so as to indicate the dive time that is measured in a form obtained by addition to 20 minutes. Moreover, the hour hand 32 is controlled so as to overlap with the minute hand 33, and the second hand 34 is controlled so as to rotate clockwise similarly to rotation in the clock mode.

Figure 7B:
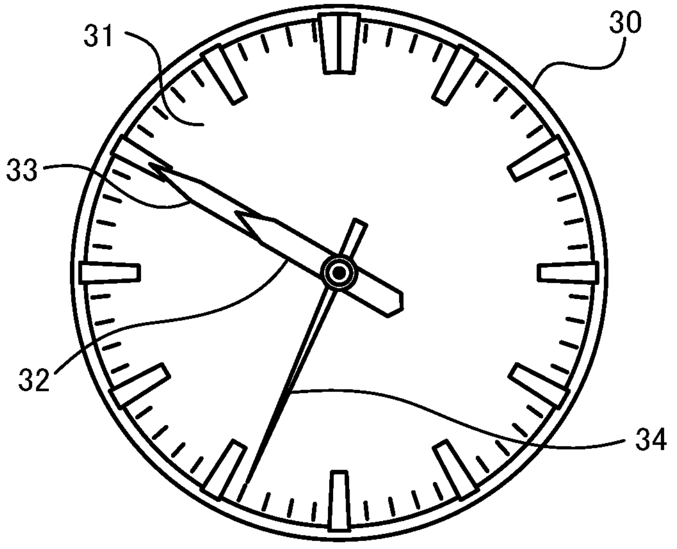
FIG. 7B is a display example drawing illustrating of the main display during elapsed time display processing according to the embodiment of the present disclosure.

Next, upon confirmation at time t4 (11:00) that the second dive time per the display illustrated in FIG. 7B reaches 30 minutes, that is, 50 minutes dive time obtained by adding the first dive time, the diver ends the second dive and rises to the water surface. Then the diver uses the operation unit 20 to perform an operation to switch the sub-mode to the rest time display mode, and the diver rests. Due to such operation, the controller 90 switches the sub-mode to the rest time display mode, starts measurement of the rest time from 0 minutes, and thus displays the measured rest time using the minute hand 33 (step S50).

Figure 8A:
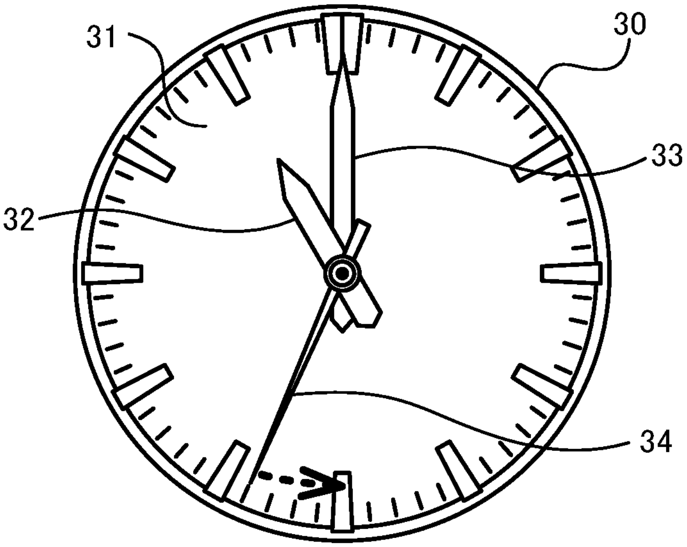
FIG. 8A is a display example drawing illustrating a main display during elapsed time display processing according to the embodiment of the present disclosure.

FIG. 8A illustrates the main display 30 immediately after switching to the rest time display mode at time t4. In the rest time display mode, the minute hand 33 indicates 0 minutes due to reset of the measured time each time measurement begins, in contrast to the dive time display mode. Thereafter during the rest time display mode, the controller 90 controls the minute hand 33 so as to indicate the measured rest time in minute units, and controls the second hand 34 so as to rotate counterclockwise one time per 60 seconds.

Figure 8B:
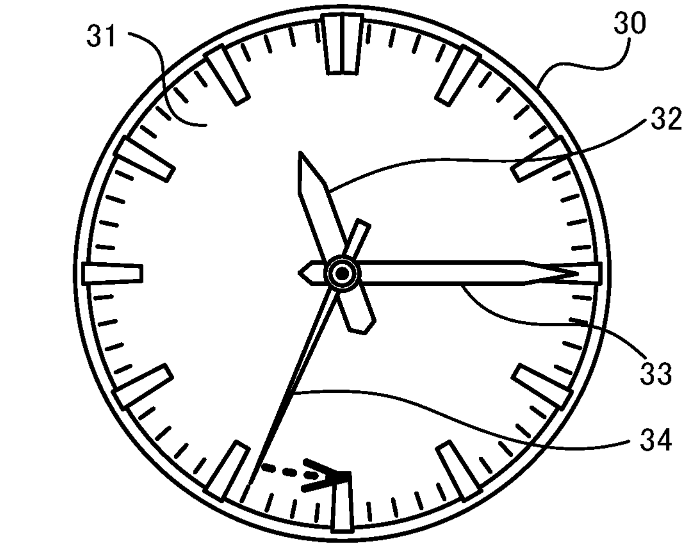
FIG. 8B is a display example drawing illustrating of the main display during elapsed time display processing according to the embodiment of the present disclosure.

Thereafter, at time t5 (11:15) upon confirmation that the second rest time reaches 15 minutes after the display illustrated in FIG. 8B, the diver ends the rest. Then the diver uses the operation 20 to operate the pointer 62 of the mode selector 60 to perform an operation to end the diver's mode. In response to such operation, the controller 90 ends the diver's mode (step S60), and controls the hour hand 32, the minute hand 33, and the second hand 34 of the main display 30 so as to indicate the present time. Elapsed time display processing ends due to the aforementioned processing.

The diver's watch 1 according to the present embodiment in the aforementioned manner has two types of display mode that are the dive time display mode for cumulatively displaying elapsed time and the rest time display mode for non-cumulatively displaying elapsed time, and by the minute hand 33 displays time measured in either of the display modes. However, the hour hand 32 and the second hand 34 indicate in a way of movement that differs during display in the dive time display mode versus during display in the rest time display mode. Specifically, in the case of display in the dive time display mode, although the hour hand 32 is controlled (first control) so as to overlap with the minute hand 33, in the case of display in the rest time display mode, the hour hand 32 is not controlled in such a manner. Moreover, in the case of display in the dive time display mode, although the second hand 34 is controlled so as to rotate clockwise as in rotation of a normal clock, in the case of measurement in the rest time display mode, the second hand 34 is controlled so as to rotate counterclockwise. Therefore, based on the difference in al direction of the hour hand 32 and second hand 34 in this manner, the diver is able to reliably determine whether the elapsed time is being displayed cumulatively (dive time display) or non-cumulatively (rest time display). Further, even during the dive time display mode or the rest time display mode, the diver is capable of knowing the present time from the sub-display 40. The diver must correctly keep in mind the dive time and the rest time of the diver. Therefore, enablement of the diver to reliably determine which present display mode is being used for display of the elapsed time is important for a diver's watch that has the dive time display mode and the rest time display mode. However, due to control of display by the analog type diver's watch mentioned in Unexamined Japanese Patent Application Publication 2009-534674, the diver may have difficulty in determining which display mode is being used for display. According to the present embodiment, by the pointer controller using the pointer to display the time, the user can reliably determine whether the elapsed time is being displayed cumulatively or is being displayed non-cumulatively.

Furthermore, the present disclosure is not limited to the aforementioned embodiment, and various types of modifications are of course possible in components that do not depart from the gist of the present disclosure.

For example, in the dive time display mode and the rest time display mode, which mode has the difference in the way of movement form of the hour hand 32 and the second hand 34 of the main display 30 is freely selected, and various types of ways of movement can be adopted. For example, in the dive time display mode and the rest time display mode, the movement of the hour hand 32 and the second hand 34 may be the reverse of that of the aforementioned embodiment.

Moreover, during display in the dive time display mode and during display in the rest time display mode, the way of movement speed of the hour hand 32 or the second hand 34 may be made different. Moreover, the second hand 34 may be moved continuously (continuous second hand) in one of the display modes, and the second hand 34 may be moved stepwise (stepping second hand) each one second to several seconds (stepwise time increment) in the other display mode.

For example, in the present embodiment, although the dive time and the rest time are displayed by the minute hand 33 of the main display 30 in the dive time display mode and the rest time display mode, the present disclosure is not limited to such configuration, and such time may be displayed using the hour hand 32 or the second hand 34.

Moreover, although the above embodiment is described while describing the diver duration time display mode and the rest time display mode each as one sub-mode of the diver's mode, the diver may be enabled to use the mode selector 60 to directly select the dive time display mode and the rest time display mode without going through the diver's mode.

Moreover, the diver's watch 1 may be provided with a function for measuring air pressure or water pressure, may be configured to determine whether a dive by the diver is in progress based on such measured values when in the diver's mode, switch automatically between the dive time display mode and the rest time display mode in accordance with a result of the determination, and perform measurement of the dive time and the rest time.

Moreover, the present disclosure is not limited to the aforementioned diver's watch 1. The present disclosure can be used with advantage for a pointer controller of all clocks or the like that are equipped with a cumulative display mode and a non-cumulative display mode and that display time by the pointer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A pointer controller comprising:

a first pointer and a second pointer; and at least one processor configured to:

in a first time period, control the first pointer and the second pointer in a first display mode in which the first pointer is controlled to move to display a first elapsed time and the second pointer is controlled to move through a first movement to indicate that the first pointer is being controlled to move according to the first display mode;

in a second time period, control the first pointer and the second pointer in a second display mode in which the first pointer is controlled to start movement from a predetermined position and to move to display a second elapsed time from a start of the second time period and the second pointer is controlled to move through a second movement different from the first movement to indicate that the first pointer is being controlled to move according to the second display mode;

in a third time period, control the first pointer and the second pointer in the first display mode in which the first pointer is controlled to move to display a third elapsed time, the third elapsed time being an elapsed time in the third time period added to a length of the first time period, and the second pointer is controlled to move through the first movement; and in a fourth time period, control the first pointer and the second pointer in the second display mode in which the first pointer is controlled to start movement from the predetermined position and to move to display a fourth elapsed time from a start of the fourth time period, and the second pointer is controlled to move through the second movement.

2. The pointer controller according to claim 1, wherein the at least one processor is configured to:

in the first movement, control the second pointer to move in a first direction; and in the second movement, control the second pointer to move in a second direction different from the first direction.

3. The pointer controller according to claim 1, wherein the at least one processor is configured to, in one of the first movement and the second movement, control the second pointer to move to overlap with the first pointer.

4. The pointer controller according to claim 1, wherein the at least one processor is configured to:

in the first movement, control the second pointer to move at a first speed; and in the second movement, control the second pointer to move at a second speed different from the first speed.

5. The pointer controller according to claim 1, wherein the at least one processor is configured to:

in one of the first movement and the second movement, control the second pointer to be moved continuously; and in the other of the first movement and the second movement, control the second pointer to be moved stepwise.

6. The pointer controller according to claim 1, wherein the first display mode is a display mode for display of a dive time of a diver, and wherein the second display mode is a display mode for display of a rest time of the diver.

7. A pointer control method for controlling a first pointer and a second pointer, the pointer control method comprising:

in a first time period, controlling the first pointer and the second pointer in a first display mode in which the first pointer is controlled to move to display a first elapsed time and the second pointer is controlled to move through a first movement to indicate that the first pointer is being controlled to move according to the first display mode;

in a second time period, controlling the first pointer and the second pointer in a second display mode in which the first pointer is controlled to start movement from a predetermined position and to move to display a second elapsed time from a start of the second time period and the second pointer is controlled to move through a second movement different from the first movement to indicate that the first pointer is being controlled to move according to the second display mode;

in a third time period, controlling the first pointer and the second pointer in the first display mode in which the first pointer is controlled to move to display a third elapsed time, the third elapsed time being an elapsed time in the third time period added to a length of the first time period, and the second pointer is controlled to move through the first movement; and in a fourth time period, controlling the first pointer and the second pointer in the second display mode in which the first pointer is controlled to start movement from the predetermined position and to move to display a fourth elapsed time from a start of the fourth time period, and the second pointer is controlled to move through the second movement.

8. The pointer control method according to claim 7, wherein, in the first movement, the second pointer is controlled to move in a first direction, and wherein, in the second movement, the second pointer is controlled to move in a second direction different from the first direction.

9. The pointer control method according to claim 7, the method further comprising:

wherein in one of the first movement and the second movement, the second pointer is controlled to move to overlap with the first pointer.

10. The pointer control method according to claim 7, wherein in the first movement, the second pointer is controlled to move at a first speed, and wherein in the second movement, the second pointer is controlled to move at a second speed different from the first speed.

11. The pointer control method according to claim 7, wherein, in one of the first movement and the second movement, the second pointer is controlled to be moved continuously, and wherein, in the other of the first movement and the second movement, the second pointer is controlled to be moved stepwise.

12. The pointer control method according to claim 7, wherein the first display mode is a display mode for display of a dive time of a diver, and wherein the second display mode is a display mode for display of a rest time of the diver.

* * * * *